A. B. McCOMBS.
HAY RAKE.
APPLICATION FILED JUNE 7, 1912.

1,062,784.

Patented May 27, 1913.

3 SHEETS—SHEET 1.

Witnesses

Alvin B. McCombs,
Inventor by C. A. Snow & Co.
Attorneys

A. B. McCOMBS.
HAY RAKE.
APPLICATION FILED JUNE 7, 1912.
1,062,784.
Patented May 27, 1913.
3 SHEETS—SHEET 2.
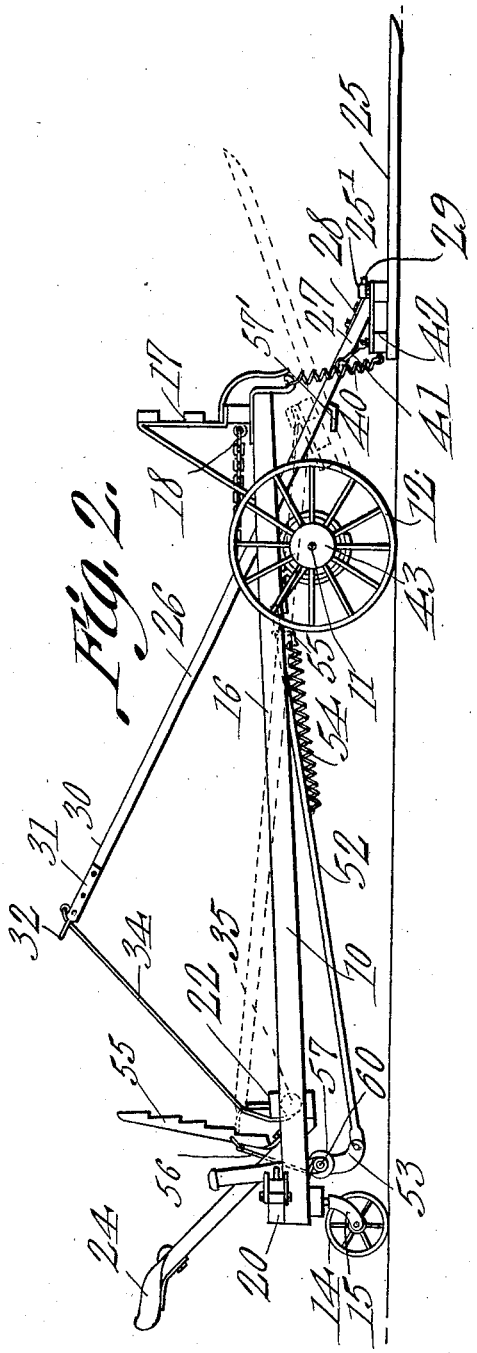
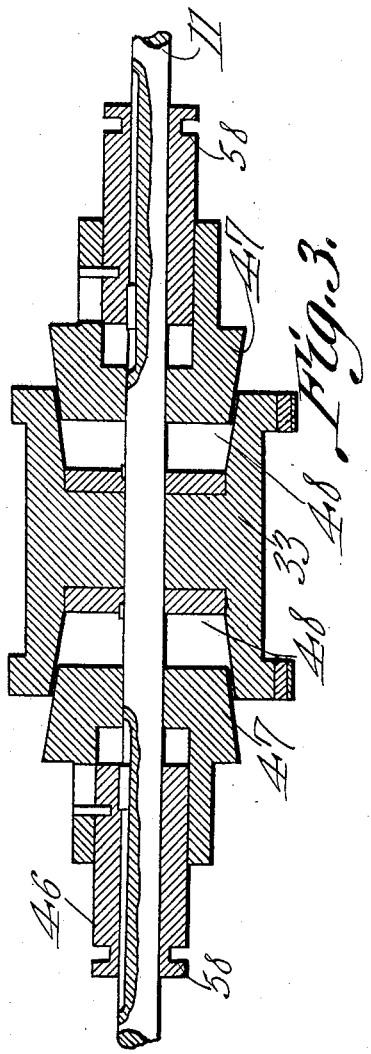
Alvin B. McCombs,
Inventor
by C.A.Snow & Co.
Attorneys
Witnesses A. B. McCOMBS.
HAY RAKE.
APPLICATION FILED JUNE 7, 1912.

1,062,784.

Patented May 27, 1913.
3 SHEETS—SHEET 3.

Witnesses

Alvin B. McCombs
Inventor
by C. A. Snow & Co.
Attorneys

UNITED STATES PATENT OFFICE.

ALVIN B. McCOMBS, OF SEDALIA, MISSOURI.

HAY-RAKE.

1,062,784.  Specification of Letters Patent.  Patented May 27, 1913.

Application filed June 7, 1912.  Serial No. 702,308.

*To all whom it may concern:*

Be it known that I, ALVIN B. McCOMBS, a citizen of the United States, residing at Sedalia, in the county of Pettis and State of Missouri, have invented a new and useful Hay-Rake, of which the following is a specification.

This invention relates to an improvement in hay rakes.

The primary object of the invention is to provide a rake which may be manipulated by the movement of the vehicle which supports the same.

A further object of the invention is to provide means for holding the rake in hay carrying position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
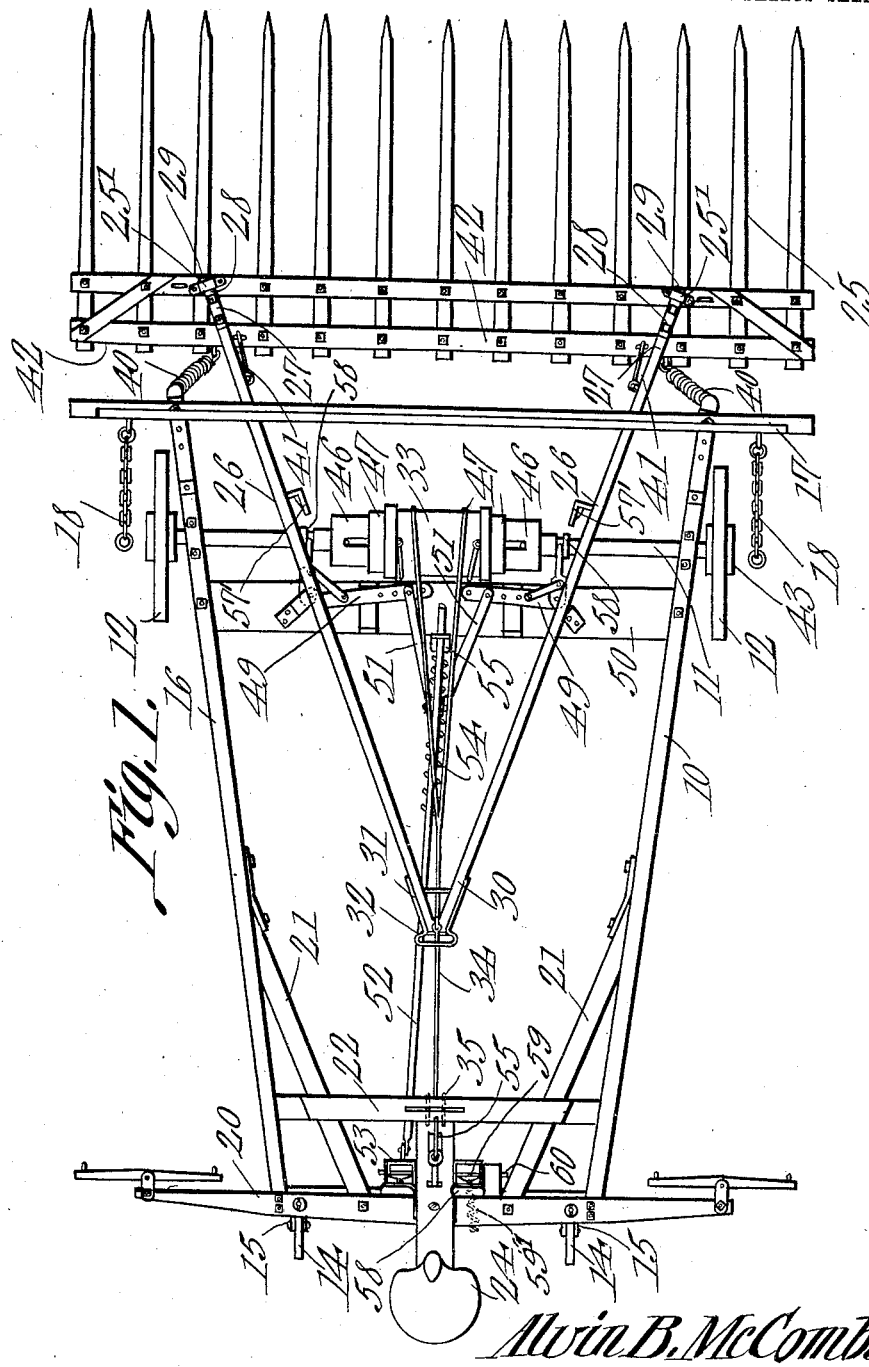
Figure 4:
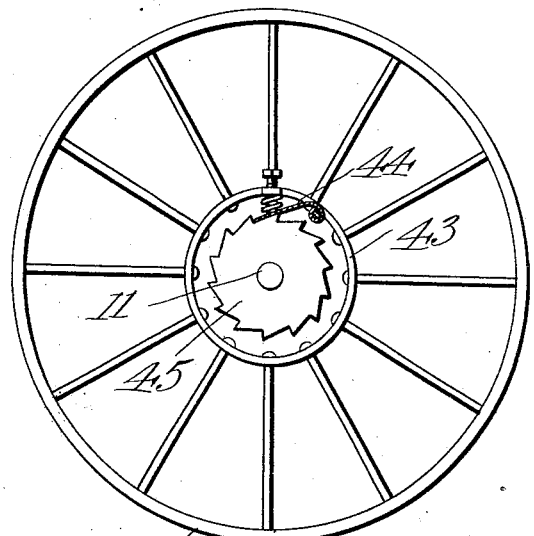
Figure 5:
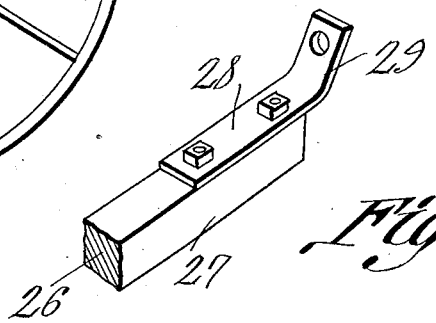
Figure 6:
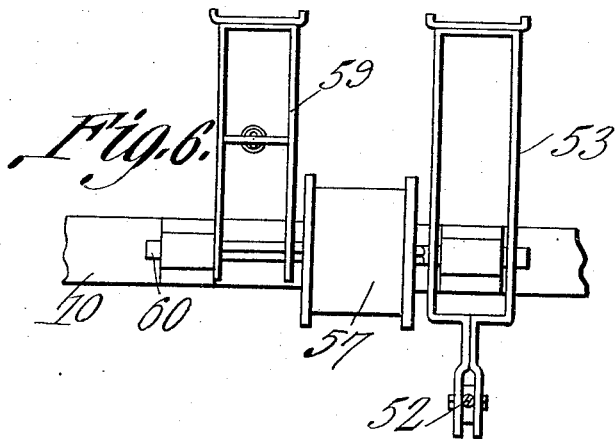

In the drawings: Figure 1 is a top plan view. Fig. 2 is a side elevation. Fig. 3 is a sectional view of the drum clutch. Fig. 4 is a view of one of the wheels. Fig. 5 is a detail view of the terminal of one of the rake supporting beams, and Fig. 6 is a detail view of the mechanism for operating the rake beam retaining means.

In the drawings, 10 designates a frame which is supported by the axle 11 on which is mounted wheels 12, and the wheels 14 which are supported by brackets 15. The frame consists of longitudinal bars 16 which at one end of the frame support a guard 17, this guard being provided with attaching devices 18 for the draft animals. The frame at the end remote from the guard 17 carries a support 20 for the double trees, the longitudinal beam 16 being connected to the support 20 by struts 21, which are connected by the bar 22 which supports the seat 24.

The rake 25 is provided with a plurality of diagonally disposed brackets 25' which receive the terminals of the rake support. The rake support consists of beams 26, the terminals 27 of which are provided with attaching devices 28, the offset terminals 29 of which enter the brackets 25', latches 41 carried by the members 26 being connected to the rake bar 42.

The terminals 30 of the beams 26 are connected by the offsets 31 of the yoke or clevis 32. A drum 33 is loosely mounted on the axle 11, and connected to said drum is a cable 34 which passes under a sleeve 35 supported between the members 22 which connect the struts 21, the cable being connected to the rake supports 26 adjacent the yoke 32. It will be noted that when the drum is rotated by movement of the shaft 11, that the cable will be wound upon the same to draw the rake support to the position shown in dotted lines, Fig. 2. The rake 25 is connected to the beam 16 by coiled springs 40 which serve as a pivot for the rake. The wheels 12 are provided with a hub 43, which supports the spring pressed pawl 44, the pawl being held in contact with the ratchet wheel 45 which is fixed on the shaft 11. The shaft turning only as the vehicle travels in one direction. A sleeve is keyed on the shaft at each side of the drum, said sleeves supporting clutch members 47 which are arranged to extend within the drum to lock the same to the shaft. It will be noted that when the drum is locked to the shaft that the cable will be wound to raise the rake member. The sleeves 46 are moved upon the shaft by means of pivoted levers 49 arranged on the transverse bar 50. These levers being actuated by the links 51 which are connected to the bar 52, said bar being reciprocated to move the lever by the pedal 53, the rod being normally retained in a position to hold the sleeve out of contact with the drum by the coiled spring 54, one end of which is secured to the bar, the other being connected to the bracket 55 through which the rod 52 extends.

The rake beam 30 is held in its raised position by the pivoted rack 55, the yoke 32 being held by said rack at any desired height. A cable 56 is connected to the rack member 55, said cable being connected to the drum 57. This drum is rotated by means of a pedal 59 to which a spring 59' is connected, said pedal being mounted on the shaft 60. It will be noted that as this pedal is depressed that the cable or shaft which is wound about the drum and connected to the rack will move the rack to release the yoke 32. A cam 57' is secured to each of the members 26, the said cam 57' being disposed to enter the angular groove 58 of the members 46 when the rake is raised, and shift said members laterally so as to withdraw the clutches from the drum 33.

It will be apparent that, when the pedal 58 is actuated, the rack 55 will be shifted so as thus to release yoke 32 whereupon rake 25 will gravitate to active position thus causing the rake support 26 to swing to the position indicated by full lines in Fig. 2. As the machine is drawn forward the rake will of course gather material in the path thereof and when it is subsequently desired to elevate the gathered material the other pedal 53 is depressed and thus causes rod 52 to pull through links 51 upon the levers 49 whereupon the clutch members 47 will be shifted into engagement with drum 33 and cause the drum to rotate with the axle. Cable 34 will therefore be wound upon the drum and will pull the supporting structure 26 downwardly and rearwardly at its back end so as to engage the rack 55 and bring the cams 57' into the grooves 58. These cams will operate to shift the clutch members 47 out of engagement with drum 33 as soon as the rake has been elevated the desired distance and as the yoke 32 is at that time in engagement with the rack 55, it will be seen that the rake 25 will not return to its lower position until after the rack 55 has been disengaged from the yoke in the manner hereinbefore described.

What is claimed is:—

1. A rake comprising a wheel supported frame having a revoluble axle, a winding element loose upon the axle, a clutch for coupling said element to the axle, a structure mounted to tilt and slide upon the frame, a rake carried by said structure, a guide upon the rear portion of the frame, a flexible connection between said structure and the winding element, said connection extending rearwardly from said structure to the guide, means under the control of the operator for shifting the clutch into engagement with the winding element, and means operated by said structure during its actuation by the flexible connection and the winding element for disengaging the clutch from said element.

2. The combination with a revoluble axle, a winding element loose thereon, and a clutch, of a structure mounted to slide and swing, a rake carried thereby, a connection between the structure and winding element, a guide, said connection extending rearwardly from the structure to the guide and thence forwardly to the winding element, means under the control of the operator for shifting the clutch into engagement with said element, and means carried by the structure for disengaging the clutch from said element during the movement of the structure by the flexible connection.

3. The combination with a winding element and a clutch, of a structure carrying a rake, a guide, a flexible connection between said structure and the winding element, said connection extending rearwardly to the guide and forwardly to the winding element, means under the control of the operator for shifting the clutch into engagement with the winding element to drive said element and draw the structure downwardly and rearwardly to elevate the rake, and means upon the structure for engaging the clutch during such movement to disengage the clutch from said winding element.

4. The combination with a winding element and a clutch, of a structure carrying a rake, a guide, a flexible connection between said structure and the winding element, said connection extending rearwardly to the guide and forwardly to the winding element, means under the control of the operator for shifting the clutch into engagement with the winding element to drive said element and draw the structure downwardly and rearwardly to elevate the rake, and means for engagement by said structure for holding the structure and rake against return movement.

In testimony that I claim the foregoing as my own, I have hereto affixed my signature in the presence of two witnesses.

ALVIN B. McCOMBS.

Witnesses:
A. R. EASTON,
IRA N. SPRECHER.